United States Patent [19]

Field et al.

[11] Patent Number: 4,513,068
[45] Date of Patent: Apr. 23, 1985

[54] AUXILIARY BATTERY CHARGING TERMINAL

[75] Inventors: Harold Field, Plantation; Robert E. Richter, Coral Springs, both of Fla.

[73] Assignee: Motorola, Inc., Schaumburg, Ill.

[21] Appl. No.: 543,697

[22] Filed: Oct. 20, 1983

[51] Int. Cl.³ .............................................. H01M 2/26
[52] U.S. Cl. .................................. 429/121; 429/174; 429/178; 429/185
[58] Field of Search ................ 429/121, 122, 178–184, 429/174, 185

[56] References Cited

U.S. PATENT DOCUMENTS

| | | | |
|---|---|---|---|
| 2,802,042 | 8/1957 | Anthony et al. | 136/133 |
| 2,996,565 | 8/1961 | Ning | 136/132 |
| 3,256,117 | 6/1966 | Howatt et al. | 136/178 |
| 3,305,779 | 2/1967 | Errichiello | 325/111 |
| 3,318,737 | 5/1967 | Watanabe et al. | 136/133 |
| 3,704,173 | 11/1972 | McClelland et al. | 136/135 R |
| 3,753,781 | 8/1973 | Parker et al. | 136/167 |
| 3,841,913 | 10/1974 | Anderson | 136/167 |
| 3,977,907 | 8/1976 | Roth et al. | 429/121 X |
| 4,011,368 | 3/1977 | Mabuchi | 429/121 |
| 4,117,203 | 9/1978 | Sjogen | 429/121 X |
| 4,317,870 | 3/1982 | Oellerich | 429/161 |
| 4,337,301 | 6/1982 | Rorer et al. | 429/179 |
| 4,394,059 | 7/1983 | Reynolds | 429/121 X |
| 4,435,486 | 3/1984 | Pomaro et al. | 429/121 X |

Primary Examiner—Charles F. LeFevour
Attorney, Agent, or Firm—F. John Motsinger; Edward M. Roney; James W. Gillman

[57] ABSTRACT

In accordance with the present invention there is provided an auxiliary battery charging terminal that may selectively engage battery charging circuitry inside a portable radio pager. There is provided a current conducting cap having a downwardly and outwardly flared rim that deforms to lock under the crimped edge an insulating seal ring of a standard rechargeable cell by application of a compressive axial force. The auxiliary battery charging terminal is further provided with a central tip axially projecting upwardly from the cap. The auxiliary terminal may be further provided with a cap of reduced diameter to circumferentially engage the raised battery cathode terminal on the battery cell. A mating recess in a remote battery charging receptacle may receive the tip to captivate the battery cell against lateral displacement. The tip may be further provided with a rounded apex to relieve localized frictional forces upon insertion and removal of the battery cell from the remote battery charging receptacle.

8 Claims, 2 Drawing Figures

AUXILIARY BATTERY CHARGING TERMINAL

THE FIELD OF THE INVENTION

This invention relates to ways of causing electric battery cells to selectively engage battery charging circuitry within battery powered radio equipment. More particularly, this invention relates to an auxiliary battery charging terminal which may be placed over the cathode of a rechargeable battery cell such that a tip will conductively engage a battery charging circuit. Moreover, the tip may be captively received in a mating recess within a battery charging receptacle and may cooperate to positively hold the battery during remote charging.

BACKGROUND OF THE INVENTION

Portable paging receivers have become increasingly important to our more mobile society. Advances in battery technology play no small part in contributing to our societal mobility. As battery powered equipment, radios, and pagers came into more frequent use and were used for longer periods of time before returning to sites of fixed power distribution, battery power depletion became a problem. The advent of the rechargeable battery cell was one solution to the problem of battery power depletion. Correspondingly, battery powered equipment has had to accomodate both the conventional disposable battery cell and the rechargeable battery cell.

Initially, the rechargeable battery cell was removed from the portable electric equipment and placed into a separate battery charger located at the site of fixed electrical distribution. However, since the rechargeable battery must be manually removed from a piece of portable equipment and be manually placed into the battery charger, proper positive placement of the rechargeable battery into the battery charger became a recurrent problem. Also, the continued use of the portable electric equipment was lost while the rechargeable cell was being recharged outside of the equipment.

To alleviate this problem, charging circuits were built into the portable radio equipment itself. However, since both conventional disposable battery cells and rechargeable battery cells can be utilized to power the very same pieces of equipment, it is necessary to have the internal charging circuit distinguish between the rechargeable battery cell and the conventional disposable battery cell.

In one instance, an electrically conductive plate having an axially projecting tip was resistance welded to the flat end of the rechargeable battery cell (the anode). When the tip was present, the tip would engage the battery charging circuitry. When the tip was not present, as in the case of the conventional disposable battery cell, the charging circuits would not be engaged. Unfortunately, the resistance welding of this auxiliary tip had a corresponding cost that was not insubstantial.

In the past, this auxiliary terminal was installed on a large flat surface on the end of the battery cell (the anode). With this large surface and the entire battery jacket available for attachment of the welding electrode, attachment was easily performed using projection or resistance welding techniques. However, on the cathode end of the battery, the available welding area is small and the raised metal cathode button is effectively isolated, camouflaged and obscured by the insulating seal ring. Welding access to the cathode electrode of the battery cell is nearly impossible. This invention solves the problem by frictionally, mechanically locking a properly designed auxiliary charging terminal between the insulating seal ring of the cell and the raised cathode terminal of the battery cell.

This invention represents a significant advance over the prior design and over this technical field by providing an auxiliary battery charging terminal that may be easily attached to a conventional rechargeable battery cell without resorting to costly welding and bonding techniques.

SUMMARY OF THE INVENTION

It is the object of the present invention to provide an auxiliary battery charging terminal for a standard rechargeable battery cell such that the auxiliary terminal will selectively engage the charging circuits of a portable radio pager.

It is an object of the present invention that the auxiliary battery charging terminal be simply and easily mechanically attached to the battery cell with minimum cost. It is a further object of the present invention to eliminate the need for welded or soldered attachment.

Yet another object of the present invention is to provide an auxiliary battery charging terminal which will readily lend itself to automation with little capital investment and require only the simplest tooling for attachment.

A final object of the present invention is to provide an auxiliary battery terminal that may be positively received within a battery charging receptacle. These and other objects are accomplished by the present invention.

In accordance with the present invention there is provided an auxiliary battery charging terminal that may selectively engage battery charging circuitry inside a portable radio pager. There is provided a current conducting cap having a downwardly and outwardly flared rim that deforms to lock under the crimped edge an insulating seal ring of a standard rechargeable cell by application of a compressive axial force. The auxiliary battery charging terminal is further provided with a central tip axially projecting upwardly from the cap. The auxiliary terminal may be further provided with a cap of reduced diameter to circumferentially engage the raised battery cathode terminal on the battery cell. A mating recess in a remote battery charging receptacle may receive the tip to captivate the battery cell against lateral displacement. The tip may be further provided with a rounded apex to relieve localized frictional forces upon insertion and removal of the battery cell from the pager or remote battery charging receptacle.

The invention will be more clearly understood from the following description when read in conjunction with the accompanying drawings.

DESCRIPTION OF THE PREFERRED EMBODIMENT

Figure 1:
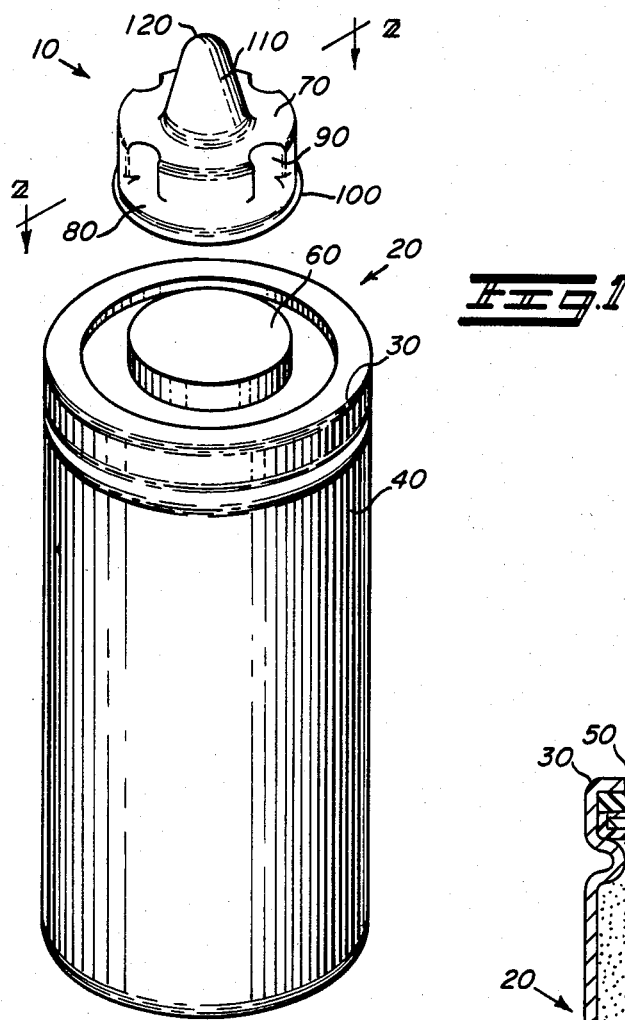
FIG. 1 is a exploded view of the preferred embodiment of the auxiliary battery charging terminal prior to assembly.
Figure 2:
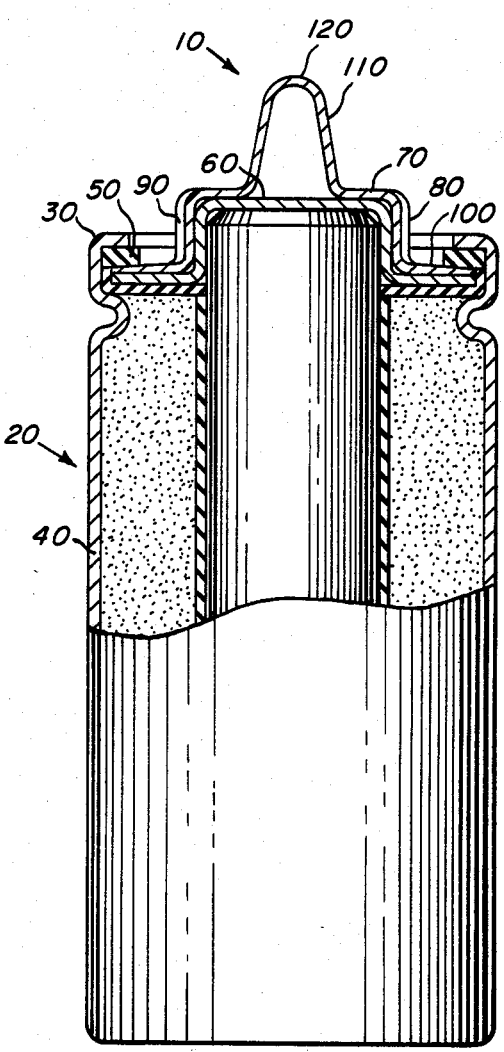
FIG. 2 is a partial vertical section view of the preferred embodiment of the auxiliary battery charging terminal mounted upon a standard rechargeable battery cell.

In the exemplary embodiment, the auxiliary battery charging terminal, generally designated 10, is mounted on a standard rechargeable battery cell, generally designated 20, under the crimped edge 30 of the battery jacket 40 and under the insulating seal ring 50. The auxiliary battery charging terminal 10 is mounted over the standard rechargeable battery cathode terminal 60 such that an electrically conductive connection is made between the auxiliary battery charging terminal 10 and the battery cathode 60.

The auxiliary battery terminal 10 has the general shape of a cap 70 having a rim 80 which may be reduced in diameter by detent projections 90 positioned along the rim 80 to circumferentially engage the raised battery cathode terminal 60 to improve the electrical conductivity therebetween. The rim is flared 100 such that an axially compressive force applied to the cap 70 will cause the flared rim 100 to cam against the cathode disk 60, deform and become entrapped under the crimped edge 30 of the battery jacket 40 and under the insulating seal ring 50. The auxiliary battery terminal 10 is further provided with a central tip 110 axially projecting upwardly from the cap 70. This tip 110 may selectively engage battery charging circuitry inside a portable radio pager. Similarly, this tip 110 may be matingly received in a battery charging receptacle outside the radio pager to constrain the battery against lateral displacement and positively captivate the battery during remote charging. The axially projecting tip 110 may be further provided with a rounded apex 120 to reduce the concentration of forces during insertion and removal of the battery from the battery charging receptacle.

Thus, an auxiliary battery charging terminal has been provided that may be simply and easily mechanically attached to a standard rechargeable battery cell without resorting to costly welding techniques and further provides for selectively engaging battery charging circuitry while in use, and for positively fixing the battery within a battery charging receptacle when not in use.

It will be appreciated by those skilled in the art that the auxiliary battery charging terminal might be incorporated into the cathode disk during the initial and original manufacture of the rechargable cell.

The foregoing description of the preferred embodiment is illustrative of the broad inventive concept comprehended by the invention and has been given for clarity of understanding. However, it is not intended to cover all changes and modifications which do not constitute departures from the spirit and scope of the invention.

What we claim and desire to secure by Letters Patent is:

1. An improved rechargeable battery cell for selectively, electrically engaging charging circuitry comprising:
    a cathode disk having a periphery and a projecting tip means for selectively, electrically engaging charging circuitry;
    an anode jacket mechanically captivating said cathode disk periphery about a battery cell; and
    an electrically insulating seal ring therebetween,
    whereby said projecting tip electrically engages said charging circuitry, whereas said charging circuitry is not engaged in the absence of said projecting tip and
    whereby said tip is axially constrained against lateral displacement within a battery charging receptacle.

2. An improved rechargeable battery cell with an auxiliary battery charging tip for selectively, electrically engaging charging circuitry comprising, in combination:
    a rechargeable battery cell having a cathode disk further having a periphery and a raised cathode button, an anode jacket mechanically captivating said cathode disk periphery about a battery cell and an electrically insulating seal ring therebetween, and
    a current conducting cap, dimensioned to conductively engage said raised cathode button and having a downwardly flared rim adapted to be received under said insulating seal ring and having a tip axially projecting upwardly for selectively, electrically engaging charging circuitry,
    whereby said projecting tip electrically engages said charging circuitry, whereas said charging circuitry is not engaged in the absence of said projecting tip and
    whereby said tip is axially constrained against lateral displacement within a battery charging receptacle.

3. An auxiliary battery charging tip as claimed in claim 2, wherein said flared rim is downwardly and outwardly flared.

4. An auxiliary battery charging tip as claimed in claim 2, wherein said flared rim is deformable whereby the deformable rim may be yieldably urged under the battery seal ring.

5. An auxiliary battery charging tip as claimed in claim 20, wherein said cap is reduced in diameter to circumferentially engage said raised battery button.

6. An auxiliary battery charging tip as claimed in claim 5, wherein said diameter reduction further comprises a plurality of detents about the cap circumference.

7. An apparatus as claimed in claim 1 or 2, wherein said upwardly projecting axial tip is centrally disposed.

8. An apparatus as claimed in claim 1 or 2, wherein said tip has a rounded apex.

* * * * *

UNITED STATES PATENT AND TRADEMARK OFFICE
CERTIFICATE OF CORRECTION

PATENT NO. : 4,513,068
DATED : April 23, 1985
INVENTOR(S) : Harold Field, et al.

It is certified that error appears in the above-identified patent and that said Letters Patent is hereby corrected as shown below:

In Column 4, line 46, delete "20" and insert --2--.

*Signed and Sealed this*

*Twenty-seventh* Day of *August 1985*

[SEAL]

*Attest:*

DONALD J. QUIGG

*Attesting Officer*     *Acting Commissioner of Patents and Trademarks*